Nov. 9, 1971  E. R. SHULL ET AL  3,618,378
SEAT BELT TRANSDUCER
Filed Oct. 2, 1969
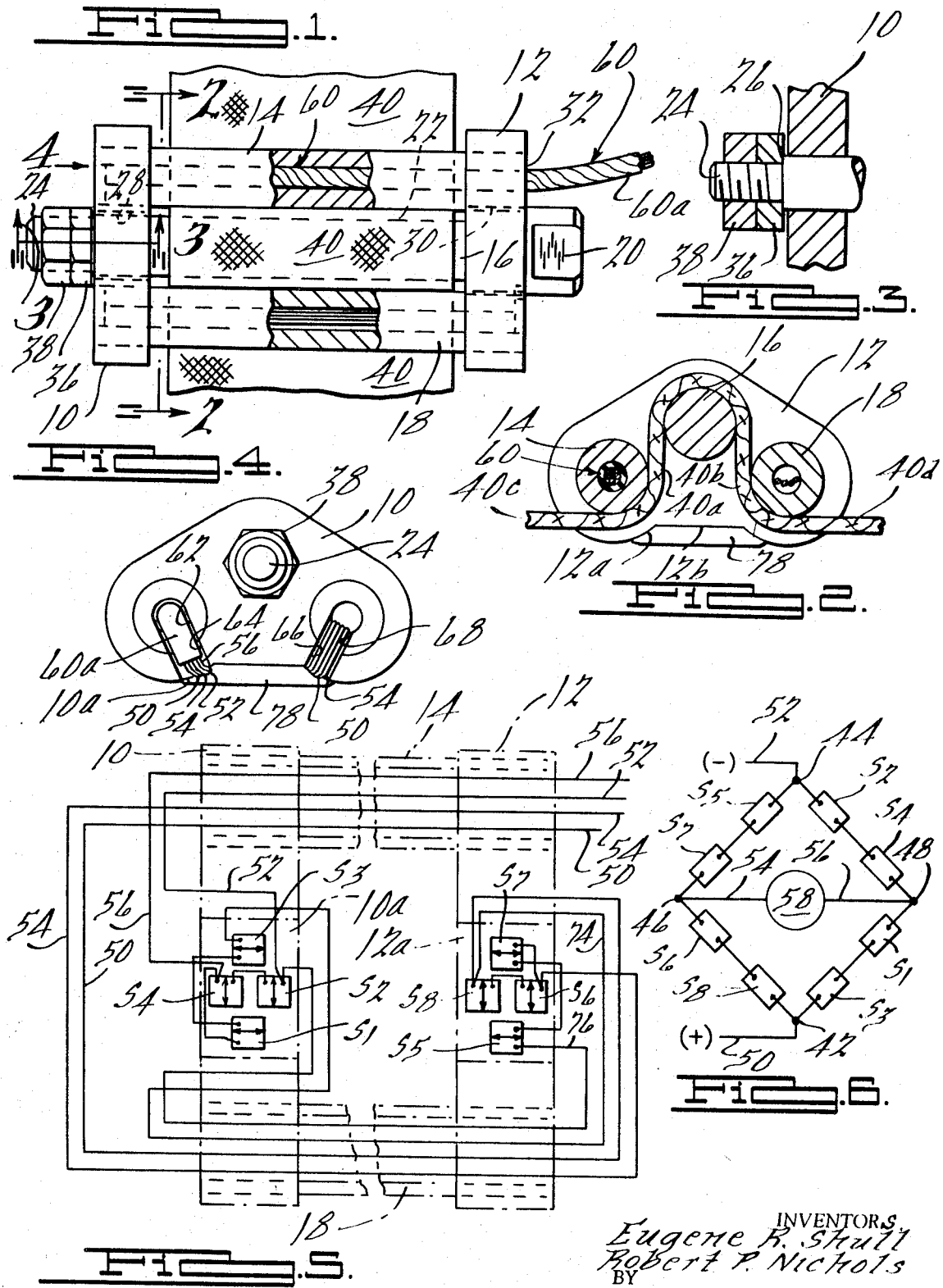
INVENTORS
Eugene R. Shull
Robert P. Nichols
BY
Harness Dickey & Baldwin
ATTORNEYS.

United States Patent Office 3,618,378
Patented Nov. 9, 1971

3,618,378
SEAT BELT TRANSDUCER
Eugene R. Shull, Detroit, and Robert P. Nichols, Mount Clemens, Mich., assignors to Chrysler Corporation, Highland Park, Mich.
Filed Oct. 2, 1969, Ser. No. 863,281
Int. Cl. G01l 5/12
U.S. Cl. 73—144       9 Claims

ABSTRACT OF THE DISCLOSURE

A transducer for measuring seat belt loads comprising two end plates and three parallel spaced bars extending rigidly between the end plates and arranged in an isoceles triangular pattern; the transducer is arranged on the belt with the plane of the first and third bars generally parallel to the plane of the entering and exiting belt portions. The belt enters under the first bar, then passes upwardly over the second bar and then passes downwardly and exits under the third bar so that, upon loading of the belt, the first and second bars are forced apart by the belt tension and the edge face of each end plate opposite the second bar is strained in proportion to the belt load. This strain is sensed and transduced into an electrical readout signal by strain gage means secured to the strained edge faces of the end plates.

BACKGROUND OF THE INVENTION

A seat belt transducer is designed to measure tension forces occurring in the seat belt webbing in response to the inertial movement of a belted dummy during staged vehicular impact tests. Many transducers capable of measuring these belt forces are currently available; however, for many test purposes it is desirable to position the transducer in a relatively cramped location within the vehicle such, for example, as on the inboard end of the front passenger seat between the belt anchorage on the rear passenger floor and the actual front seat structure. None of the available transducers is compact enough to fit readily into such small spaces. The available transducers are also inconvenient to assemble or disassemble with respect to the belt webbing, requiring in most cases that the entire belt, including end fixtures, be threaded through the transducers to position the transducer at the desired location along the belt webbing. Further, many of the known transducers fail to grip the belt webbing securely with the result that the transducer tends in use to be displaced along the belt webbing from its desired, preset location on the webbing.

SUMMARY OF THE INVENTION

It is an object of the present invention to provide an improved transducer for measuring belt loads.

A more specific object is to provide a belt transducer which is especially suitable for use in the confined spaces on, around and adjacent the seats in a motor vehicle interior.

The seat belt transducer of the invention includes a pair or rigid end plates which are disposed in spaced parallel planes with their side faces in confronting relation. First, second and third bar members extend in parallel spaced relation between the end plates in a triangular pattern, and strain gage means are mounted on an edge face of at least one of the end plates. The strain gage means function to sense strain occurring in that edge face in response to a load imposed on a belt member woven successively under the first bar member, over the second bar member, and under the third bar member.

In its disclosed embodiment, the edge face mounting the strain gage means is disposed generally parallel to the plane containing the first and third bar members and on the opposite side of that plane from the second bar member. As the belt is put under a tension load upon a staged impact, the first and third bars are pulled apart by the belt tension to generate a strain in the adjacent edge face, and this strain is sensed and fed to appropriate readout instrumentation.

According to a further feature of the invention, the first and third bars are permanently affixed to the end plates but the second bar member comprises a bolt passing through aligned bolt holes in the end plates for threaded coaction with a nut, so that the second bar member may be quickly disassembled from the end plates to allow ready insertion and removal of the belt member.

According to yet another feature of the invention, strain gage means are provided on an edge face of each of the end plates, and the first and third bar members are hollow to enable conductor means to be extended through the first and third bar members to electrically interconnect the strain gage means on the two end plates.

These and other objects, features and advantages of the invention will be apparent from the detailed description of the preferred embodiment of the invention and from the accompanying drawings.

BRIEF DESCRIPTION OF THE DRAWINGS

The preferred embodiment of the invention is shown in the drawings wherein:

FIG. 1 is a fragmentary top view of the seat belt transducer of the invention showing a seat belt interwoven through the transducer;

FIGS. 2 and 3 are cross sectional views taken on lines 2—2 and 3—3, respectively, of FIG. 1;

FIG. 4 is an end view of the invention transducer looking in the direction of the arrow 4 in FIG. 1;

FIG. 5 is a schematic top view of the invention transducer illustrating the electrical interconnection of the various strain gage means; and FIG. 6 is a wiring diagram for the invention transducer.

DETAILED DESCRIPTION OF THE PREFERRED EMBODIMENT

The seat belt transducer of the invention, broadly considered, comprises a pair of end plates 10, 12 interconnected by first, second and third bar members (14, 16, 18) extending in parallel, spaced relation between the end plates and arranged in a triangular pattern.

End plates 10, 12 have a triangular shape and are formed of a suitable steel material such, e.g., as SAE 8640. The lower triangular edge of each end plate is cut away to define a recess 10a, 12a at the bottom of each end plate having a recessed, protected edge face 10b, 12b.

First and third bar members 14, 18 are in the form of steel tubes received with a press fit at their opposite ends in suitable holes in end plates 10, 12. Bar members 14, 18 thus rigidly interconnect end plates 10, 12.

Bar member 16 is in the form of a steel bolt having a head portion 20, a shank portion 22, a reduced diameter threaded end portion 24, and a shoulder 26 formed at the juncture of shank portion 22 and reduced diameter threaded portion 24. Bolt 16 passes through aligned holes 28, 30 in end plates 10, 12 with head portion 20 bearing against the outer side face 32 of end plate 12 and the threaded end portion 24 extending beyond the outer side face 34 of end plate 10 for threaded engagement with a pair of nuts 36, 38. Nut 38 is limited in its inward threaded movement along the bolt by engagement with shoulder 26. Shoulder 26 thus prevents nut 36 from being tightened on bolt 16 to an extent to cause end plates 10, 12 to be squeezed inwardly from their desired laterally spaced positions. Bolt 16 and tubes 14, 18 may be formed, e.g., of SAE 8640 steel.

As best seen in FIGS. 2 and 4, bolt 16 and tubes 14, 18 are arranged in an isoceles triangular pattern with bolt 16 lying at the intersection of the two equal sides of the triangular pattern. The web 40 of the seat belt to be tested is interwoven through members 14, 16 and 18. Specifically, web 40 enters the transducer by passing under tube 14, thereafter extends upwardly and passes over the shank of bolt 16, and then passes downwardly and exits under tube 18. The centerlines and diameters of members 14, 16, and 18 are selected so that the upwardly and downwardly extending web portions 40a, 40b are generally vertical; that is, generally normal to the plane of members 14, 18 and to the plane of the entering and exiting web portions 40c, 40d.

A plurality of strain gages S are fastened to each recessed end plate edge face 10b, 12b. Specifically, four strain gages $S_1$, $S_2$, $S_3$, $S_4$ are bonded to edge face 10b and four strain gages $S_5$, $S_6$, $S_7$, $S_8$ are bonded to edge face 12b. Gages $S_2$ and $S_4$ on edge face 10b, and gages $S_6$ and $S_8$ on edge face 12b, are oriented in a direction to sense first order strain occurring in the edge faces in a direction generally normal to bar members 14, 16, 18. Gages $S_1$ and $S_3$ on edge face 10b, and gages $S_5$ and $S_7$ on edge face 12b are oriented in a direction to sense second order strain occurring in the edge faces in a direction parallel to bar members 14, 16, 18. All of the strain gages are of identical construction and may, for example, be of the type available from Micro Measurement Inc. of Romulus, Mich. as Part No. EA–06–031–CF.

As seen in FIG. 6, the various strain gages are wired together into a Wheatstone Bridge having applied input terminals 42, 44 and conjugate output terminals 46, 48. First order gages $S_6$, $S_8$ form the arm of the bridge between terminals 42 and 46, first order gages $S_2$, $S_4$ form the diametrically opposite arm of the bridge between terminals 44 and 48, second order gages $S_7$, $S_5$ form the arm of the bridge between terminals 44 and 46, and second order gages $S_1$, $S_3$ form the diametrically opposite bridge arm between terminals 42 and 48. Power supply conductors 50 and 52 are connected to input terminals 42 and 44, respectively, to provide a voltage source for the bridge, and output conductors 54 and 56 are connected to output terminals 46 and 48, respectively, to pick up the bridge readout signal. Conductors 54 and 56 are in turn connected to suitable readout instrumentation 58. Instrumentation 58 may, for example, comprise a carrier amplifier feeding to a galvanometer system.

The actual physical manner in which the strain gages are wired together to form the Wheatstone bridge is best seen in FIGS. 1, 4 and 5. A wire cable 60 comprising a sheath 60a encasing conductors 50, 52, 54, 56 passes through tube 14 from right to left as viewed in FIGS. 1 and 5 and emerges from tube 14 adjacent the outer side face 34 of end plate 10 where it is bent downwardly and seats in aligned grooves 62, 64 cut into the left end of tube 14 and the outer side face 34 of end plate 10, respectively. The sheath 60a of cable 60 is stripped away at this point to expose the individual conductors 50, 52, 54, 56 which continue downwardly and enter recess 10a in the bottom edge of end plate 10. As best seen in FIG. 5, conductors 52 and 56 connect directly to one terminal of strain gages $S_2$ and $S_4$, respectively, bonded to the edge surface 10b of end plate 10. Conductors 50 and 54 pass directly through recess 10a and then pass upwardly through aligned grooves 66, 68 cut into the left end of tube 18 and end plate outer side face 34, respectively, whereafter they enter tube 18 and pass through that tube from left to right as viewed in FIGS. 1 and 4. Conductors 50, 54 emerge from the tube 18 at the outer face 32 of end plate 12, whereupon they are bent downwardly and pass downwardly through aligned grooves 20, 22 cut into the right end of tube 18 and end plate outer face 32, respectively. Conductors 50, 54 thereafter enter recess 12a in the bottom edge of end plate 12 where they connect directly to strain gages $S_8$ and $S_6$, respectively, bonded to edge face 12b. Strain gages $S_8$–$S_6$, $S_6$–$S_7$ and $S_5$–$S_7$ are locally interconnected at edge face 12b. Conductors 74, 76 are respectively connected to gages $S_8$ and $S_5$ on edge face 12b and extend upwardly through aligned grooves 70, 72 and enter tube 18; conductors 74, 76 pass from right to left in tube 18 and then pass downwardly through grooves 66, 68 and enter recess 10a where they connect directly to strain gages $S_3$ and $S_2$. Strain gages $S_2$–$S_4$, $S_1$–$S_3$, and $S_1$–$S_4$ are locally interconnected at edge face 10b to complete the Wheatstone bridge in accordance with the wiring diagram of FIG. 6. The strain gages and wires disposed in each recess 10a, 12a are preferably covered and protected by a waxy mass 78 of coating material which may be of the type, for example, available from William T. Bean Inc. of Detroit, Mich. under the trade designation of Gage Coat 5.

OPERATION OF THE PREFERRED EMBODIMENT

In laboratory use for staged vehicle impact tests, the webbing of the seet belt on the crush dummy is woven through bar members 14, 16, 18 in the manner illustrated. Upon staged impact, the belt webbing is loaded in tension by the initial movement of the dummy. The tensioned webbing pulls on tubes 14, 18 and tends to spread them apart with the result that the material of the end plates at the edge faces 10b, 12b is strained with the first order of strain occurring generally in a direction normal to tubes 14, 18. The strain occurring at edge faces 10b, 12b is actually the resultant of a direct stress generated in the test edge faces by the outward or splaying movement of the tubes, and a bending stress generated in the test edge faces by the tendency of each end plate to behave during impact as a beam undergoing a bending load imposed on its ends by the upward movement of tubes 14, 18 relative to bolt 16. The utilization of a combined strain increases the sensitivity of the transducer.

As the material of the test edge faces is strained, resistance of the strain gages is selectively varied to selectively vary the balance of the Wheatstone bridge and produce a bridge readout signal relatable to the tension occurring in the belt webbing. Strain gages $S_1$ and $S_3$ serve as temperature compensator gages with respect to gages $S_2$ and $S_4$ so that any variation in the resistance of gages $S_2$ and $S_4$ resulting from temperature variation will be washed out on the Wheatstone bridge by a similar temperature induced varition in the resistance of gages $S_1$ and $S_3$. Gages $S_5$ and $S_7$ serve a similar temperature compensation bridge washout function with respect to gages $S_6$ and $S_8$.

Bolt 16 enables the belt webbing to be installed in, and removed from, the transducer without necessity of threading the entire belt web plus end fittings through the bar members of the transducer. To remove the webbing from the transducer, nuts 36, 38 are simply unscrewed from bolt 16 to allow the bolt to be slid axially out of engagement with the webbing whereafter the transducer is completely free of the webbing. To install the transducer on the belt webbing, the transducer is placed on the webbing, a bight of webbing is pulled up from between tubes 14, 18, and bolt 16 is slid through the bight of the web and threaded into nuts 36, 38.

The triangular configuration of bar members 14, 16, 18 enables the belt webbing to engage the bar members with a cinching action, thereby minimizing any tendency of the transducer to slide along the webbing after installation it being noted that the clearance space or spacing between the outer cylindrical surface of the member 16 and member 14 and between the member 16 and member 18, as measured in a plane parallel to the plane containing the center-lines of members 14 and 18, is approximately equal to the thickness of the belt webbing extending vertically therebetween, as indicated in FIGS. 1 and 2.

The invention transducer will be seen to provide a compact, rugged and sensitive unit which is ideally suited for use in measuring tension loads generated in seat belt webbing during staged vehicular impact tests.

Although a preferred embodiment of the invention has been illustrated and described in detail, it will be apparent that various changes and modifications may be made in the disclosed embodiment without departing from the scope or spirit of the invention.

We claim:

1. A transducer for measuring seat belt loads comprising,
    (A) a pair of rigid end plates lying in spaced apart parallel planes according to the belt width with their side faces in confronting relation;
    (B) first, second and third bar members extending in parallel spaced relation between said end plates; and
    (C) strain gage means mounted on one edge face of at least one of said end plates to sense strain occurring in that edge face in response to a load imposed on a belt member woven successively under said first bar member, over said second bar member, and under said third bar member;
    (D) said edge face of said one end plate being generally parallel to the plane containing said first and third bar members and located on the opposite side of that plane from said second bar member, the distance between said edge face and said second bar member being greater than the distance between said second bar member and another edge face of said one end plate on the opopsite side of the second bar member as measured along a line normal to said edge faces;
    (E) said bar members arranged in an isoceles triangular pattern with said second bar member located at the intersection of the two equal sides of the triangle and spaced from said first and third bar members so that the portions of the belt member between the first and second bar members and between the second and third bar members are generally normal to the plane containing said first and third bar members, thereby increasing the contacting surface area of the belt with said members and the frictional resistance therewith to prevent slippage of the belt with respect to the transducer.

2. A seat belt load transducer according to claim 1 wherein said end plates are also of generally triangular configuraion in a pattern congruent to and encompassing the triangular arrangement of said bar members.

3. A seat belt load transducer according to claim 1 wherein
    (F) there are strain gage means as aforesaid mounted on said other end plate in a position thereon corresponding to the position of the gage means on said one end plate.

4. A seat belt load transducer according to claim 1 and further including
    (D) quick disconnect coupling means associated with and at least one of said bar members to allow that member to be disassembled from said end plates to facilitate insertion of said belt.

5. A seat belt load transducer according to claim 4 wherein
    (E) said one bar member is said second bar member.

6. A seat belt load transducer according to claim 5 wherein
    (F) said quick disconnect coupling means comprise
        (1) a head on one end of said second bar member
        (2) a reduced diameter threaded portion at the other end of said second bar member and
        (3) a nut for coaction with said threaded portion; and
    (G) said second bar member passes through aligned bolt holes in said end plates with said head bearing against the outer side face of one of said end plates and said nut being disposed adjacent the outer side face of the other of said end plates and being limited in its inward threaded movement along said second rod member by engagement with a shoulder defined by the juncture of said threaded portion and the main body portion of the bar member and extending past the said outer side face of said one of said end plates.

7. A seat belt load transducer according to claim 1 wherein
    (D) strain gage means are also provided on an edge face of said other end plate;
    (E) said first and third bar member are hollow; and
    (F) said transducer further includes conductor means extending through said hollow first and third member to electrically interconnect the strain gage means on said end plates.

8. A seat belt load transducer according to claim 7 wherein
    (G) each of said strain gage means includes at least two strain gages with each strain gage pair including a first order strain gage oriented in a direction to sense strain occurring in a direction generally normal to said bar member and a second order strain gage oriented in a direction to sense strain occurring in a direction generally parallel to said bar members; and
    (H) said conductor means were wired to arrange said first and second strain gages into a Wheatstone bridge with said first order strain gages on said end plates respectively defining diametrically opposite arms of said bridge and the respective second order strain gages defining the remaining resistance arms.

9. A seat belt load transducer according to claim 8 wherein
    (I) there are two of said first order strain gages and two of said second order strain gages on each of said end plates; and
    (J) each of said diametrically opposite Wheatstone arms comprises two associated first order strain gages wired together and each of said remaining arms comprises two associated second order strain gages wired together.

References Cited

UNITED STATES PATENTS

| | | | |
|---|---|---|---|
| 2,277,925 | 3/1942 | MacClatchie | 73—144 |
| 2,452,302 | 10/1948 | Hitchen | 73—144 |
| 2,743,606 | 5/1956 | Webber | 73—144 |
| 2,795,136 | 6/1957 | Matt | 73—144 |
| 3,034,346 | 5/1962 | Starr | 73—141 |
| 3,088,083 | 4/1963 | Ward | 73—88.5 |
| 3,228,240 | 1/1966 | Ormond | 73—141 |
| 3,260,106 | 7/1966 | Hull | 73—144 |
| 3,310,981 | 3/1967 | Nixon | 73—144 |
| 3,426,589 | 2/1969 | Brendel | 73—144 |

FOREIGN PATENTS 1,320,892   11/1963   France.

RICHARD C. QUEISSER, Primary Examiner

J. WHALEN, Assistant Examiner

U.S. Cl. X.R.

73—88.5